(12) United States Patent
Wang

(10) Patent No.: US 10,768,292 B2
(45) Date of Patent: Sep. 8, 2020

(54) SURVEILLANCE APPARATUS HAVING A RADAR SENSOR

(71) Applicant: Sony Corporation, Tokyo (JP)

(72) Inventor: Qi Wang, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 1030 days.

(21) Appl. No.: 14/978,347

(22) Filed: Dec. 22, 2015

(65) Prior Publication Data

US 2016/0187476 A1 Jun. 30, 2016

(30) Foreign Application Priority Data

Dec. 29, 2014 (EP) ..................................... 14200467

(51) Int. Cl.

| G01S 13/42 | (2006.01) |
|---|---|
| G01S 13/86 | (2006.01) |
| G01S 13/88 | (2006.01) |
| G01S 13/34 | (2006.01) |
| G01S 7/35 | (2006.01) |

(52) U.S. Cl.
CPC ............ *G01S 13/42* (2013.01); *G01S 13/343* (2013.01); *G01S 13/867* (2013.01); *G01S 13/886* (2013.01); *G01S 2007/356* (2013.01)

(58) Field of Classification Search
CPC ...................................................... G01S 13/42
USPC .......................................................... 342/52
See application file for complete search history.

(56) References Cited

U.S. PATENT DOCUMENTS

| 7,576,682 B1 | 8/2009 | Yu |
| 7,847,733 B2 | 12/2010 | Shirakawa |
| 8,730,099 B2 | 5/2014 | Kanamoto et al. |
| 2007/0120730 A1* | 5/2007 | Takano ................... G01S 13/42 342/70 |

(Continued)

FOREIGN PATENT DOCUMENTS

| CN | 101900805 | 10/2012 | |
| WO | WO-2013096704 A1 * | 6/2013 | ............... G01S 5/02 |

OTHER PUBLICATIONS

Jian Li et al. "Computationally Efficient Angle Estimation for Signals with Known Waveforms", IEEE Transactions on Signal Processing, vol. 43, No. 9, 1995, 10 pages.

(Continued)

*Primary Examiner* — Peter M Bythrow
*Assistant Examiner* — Helena H Seraydaryan
(74) *Attorney, Agent, or Firm* — Xsensus LLP

(57) ABSTRACT

A surveillance apparatus for determining a position of an object in a field of view, comprising a radar sensor having at least one transmitting antenna configured to transmit electromagnetic radiation and a plurality of receiving antennas configured to receive electromagnetic radiation including a reflection signal of the object, wherein the antennas form an antenna array, and a processing unit connected to the radar sensor to receive signals from the receiving antennas corresponding to the received electromagnetic radiation, wherein the processing unit is configured to estimate a distance and a direction of the position of the object in the field of view with respect to the radar sensor, wherein the processing unit is configured to estimate the distance and the direction separately on the basis of a maximum likelihood based algorithm.

17 Claims, 4 Drawing Sheets

(56) References Cited

U.S. PATENT DOCUMENTS

| | | | | |
|---|---|---|---|---|
| 2015/0097717 A1* | 4/2015 | Tsai | ........................... | G01S 3/74 |
| | | | | 342/147 |
| 2015/0185316 A1* | 7/2015 | Rao | ........................ | G01S 7/032 |
| | | | | 342/146 |
| 2016/0377713 A1* | 12/2016 | Kamo | ....................... | G01S 7/35 |
| | | | | 342/157 |

OTHER PUBLICATIONS

V.N. Hari et al. "A Decoupled Approach for Near-Field Source Localization Using a Single Acoustic Vector Sensor", DOI 10.1007/s00034-012-9508-9, www.springerlink.com, Circuits Systems and Signal Processing, 2013, 15 pages.

Joe C Chen et al. "Maximum-Likelihood Source Localization and Unknown Sensor Location Estimation for Wideband Signals in the Near-Field", IEEE Transactions on Signal Processing, vol. 50, No. 8, 2002, 12 pages.

V.N. Hari et al. "Near-field/far-field source localization in ocean with an acoustic vector sensor array using polynomial rooting", Proceedings of SYMPOL, 2013, 8 pages.

Ralph O. Schmidt et al. "Multiple Emitter Location and Signal Parameter Estimation", IEEE Transactions on Antennas and Propagation, vol. AP-34, No. 3, 1986, 5 pages.

Alexandru Dinu "Direction of Arrival estimation for MIMO FMCW RADAR: EM and SAGE algorithms", Master Thesis, Munich University of Technology, 2014, 70 pages.

\* cited by examiner

SURVEILLANCE APPARATUS HAVING A RADAR SENSOR

BACKGROUND

Field of the Disclosure

The present disclosure relates to the field of surveillance systems for safety and security applications. A surveillance apparatus for determining a position of an object in a field of view having a radar sensor and a corresponding surveillance method are disclosed. Application scenarios include burglar, thefts or intruder alarm as well as monitoring public and private areas, inside or outside.

Description of Related Art

Optical surveillance cameras are used in many public places like train stations, stadiums, subways etc. to prevent crimes or to identify criminals after they committed a crime. Optical surveillance cameras are widely used in the retail stores for video surveillance. Other important applications are safety-related applications including the monitoring of doors, entrance areas and exits for example emergency exits. Optical security cameras and surveying systems show good performance during regular operating conditions, however, the optical surveillance cameras are prawn to visual impairments. The images of the optical surveillance cameras can be impaired by smoke, dust, fog, fire and dirt on the camera system and the like. Furthermore a sufficient amount of ambient light or additional artificial light is necessary in order to illuminate the area to be surveyed.

An optical surveillance camera is also vulnerable to attacks of the optical system, for example paint from a spray attack, stickers glued to the optical system, cardboard or paper obstruction in the field of view, or simply a photograph that pretends that the expected scene is monitored. Furthermore, the optical system can be attacked by laser pointers, by blinding the camera or by mechanical repositioning of the optical system.

Radar technology can in general overcome the drawbacks of the optical cameras, since electromagnetic waves in the millimeter-wave can penetrate most of the obstructions like smoke, dust, paint, card-board and clothes. Furthermore, radar systems can be used for precise positioning of a target, wherein a radar system can be integrated or added to an optical surveillance camera to improve the performance of the surveying system in general.

By using digital beam forming the need for conventional and physically large phased-array radar antenna systems can be omitted so that a compact size of the radar surveying system can be achieved. Since radar sensors work at lower frequencies than optical systems, a compact radar system cannot achieve a high resolution to identify targets in the field of view using conventional beam forming methods.

In the related art many methods are known for determining and estimating a target direction in a field of view of a radar sensor system using maximum likelihood estimation algorithms or MUSIC algorithms, however, the known methods for estimating a position of a target in the field of view are complicated and require large technical effort and a large calculation effort.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object of the present disclosure to provide a surveillance apparatus and a corresponding surveillance method which overcome the above-mentioned drawbacks, in particular to determine a position of an object in the field of view with low technical effort. It is a further object to provide a corresponding computer program and a non-transitory computer-readable recording medium for implementing said method.

According to an aspect of the present disclosure there is provided a surveillance apparatus for determining a position of an object in a field of view comprising:

a radar sensor having at least one transmitting antenna configured to emit or transmit electromagnetic radiation and a plurality of receiving antennas configured to receive electromagnetic radiation including a reflection signal of the object, wherein the antennas form an antenna array, and a processing unit connected to the radar sensor to receive signals from the receiving antennas corresponding to the received electromagnetic radiation, wherein the processing unit is configured to estimate a distance and a direction of the position of the object in the field of view with respect to the radar sensor, wherein the processing unit is configured to estimate the distance and the direction separately on the basis of a maximum likelihood based algorithm.

According to a further aspect of the present disclosure there is provided a corresponding surveillance method for estimating a position of an object in a field of view of a radar sensor comprising the steps of:

receiving electromagnetic radiation from the field of view by means of a plurality of receiving antennas, receiving signals from the receiving antennas corresponding to the received electromagnetic radiation, and estimating a distance and a direction of the position of the object in the field of view with respect to the radar sensor, wherein the distance and the direction are estimated separately using a maximum likelihood based algorithm.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided. The program code means may also be executed on an embedded system like a digital signal processor (DSP) or an application specific integrated circuit (ASIC).

Preferred embodiments are defined in the dependent claims. It shall be understood that the claimed surveillance method, the claimed computer program and the claimed computer-readable recording medium have similar and/or identical preferred embodiments as the claimed surveillance apparatus and as defined in the dependent claims.

The present disclosure is based on the idea to determine a distance and a direction of the position of the object in the field of view with respect to the radar sensor, herein the two-dimensional estimation problem comprising the estimation of the distance and the direction of the position of the object in the field of view is converted into two independent one-dimensional estimation problems to detect the position of the object in the field of view. In this respect, the distance and the direction of the object in the field of view are estimated separately and estimated on the basis of a maximum likelihood algorithm. Since the estimation problem is converted into two independent one-dimensional estimation problems, the overall technical effort and the calculation effort for estimating the separated distance and the direction value can be significantly reduced.

The surveillance apparatus in particular combines a frequency modulated continuous wave technique with a maximum likelihood method in order to detect the distance and the direction of the object in the field of view separately with respect to the radar sensor which increases the maximum number of objects that can be estimated by the radar sensor so that the overall detection performance of the surveillance apparatus can be improved.

Further, the surveillance apparatus can for instance overcome a near field distortion and can detect objects in the near field, since the signal for estimation of the position of the object is transformed from the time domain to the frequency domain the overall accuracy of the object detection is improved in general.

In particular, beam forming techniques are utilized and an eigenvalue based model order estimation technique is applied to the measured data so that a number of objects in the field of view can be estimated with an improved precision.

The disclosed surveillance apparatus comprises a radar sensor having one or a plurality of transmitting antennas configured to transmit electromagnetic radiation which will be reflected by the objects in the field of view in order to determine the position of the objects. The surveillance apparatus further comprises a plurality of receiving antennas configured to receive the reflected electromagnetic radiation. The antennas form an antenna array but the apparatus is not limited to the radar sensor system and can be combined with an optical camera system comprising one, two or more cameras and may in particular be provided as a retrofit system, which can be combined with an optical surveillance camera.

It is to be understood that both the foregoing general description of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
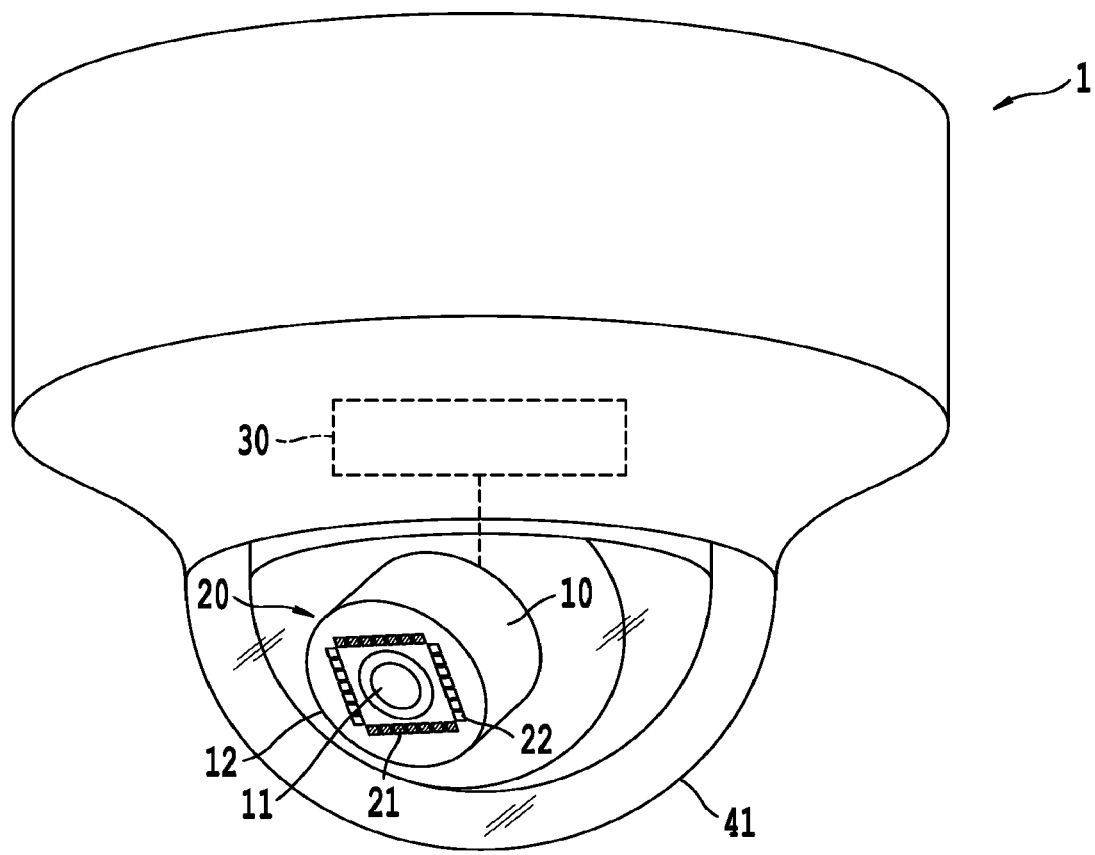
FIG. 1 shows an embodiment of a surveillance apparatus according to the present disclosure.

Referring now to the drawings, wherein like reference numerals designate identical or corresponding parts throughout the several views, FIG. 1 shows a first embodiment of a surveillance apparatus 1 according to the present disclosure. The surveillance apparatus 1 comprises an optical camera 10 configured to capture images based on received light, wherein the optical camera 10 comprises a camera aperture 11. The surveillance apparatus 1 further comprises a radar sensor 20 having one or more (here eight) transmitting antennas 21 (indicated by full circles) configured to emit electromagnetic radiation and a plurality of (here eight) receiving antennas 22 (indicated by empty cycles) configured to receive electromagnetic radiation. In this embodiment the antennas 21, 22 are arranged on the frame 12 of the camera 10 around the camera aperture 11. Due to their arrangement the antennas 21, 22 form an antenna array. In a more general embodiment, the surveillance system 1 merely comprise the antennas 21, 22 which form the antenna array of a radar sensor for transmitting and receiving electromagnetic waves and for determining a position of an object in a field of view of the surveying apparatus 1.

The surveillance apparatus 1 further comprises a processing unit 30 which is connected to the antennas 21, 22 of the radar sensor to control the antennas 21, 22. The processing unit 30 is connected to the antennas 21, 22 to receive signals corresponding to the received electromagnetic radiation. The received signals are in a certain embodiment alternating signals. The processing unit 30 is configured to estimate a distance and a direction of a position of an object in the field of view of the surveillance apparatus 1 as described in detail below.

The transmitting antennas 21 emit frequency modulated continuous wave radiation in order to determine a distance of the object in the field of view with respect to each of the antennas 21, 22 or the antenna array as described in detail below.

Figure 2:
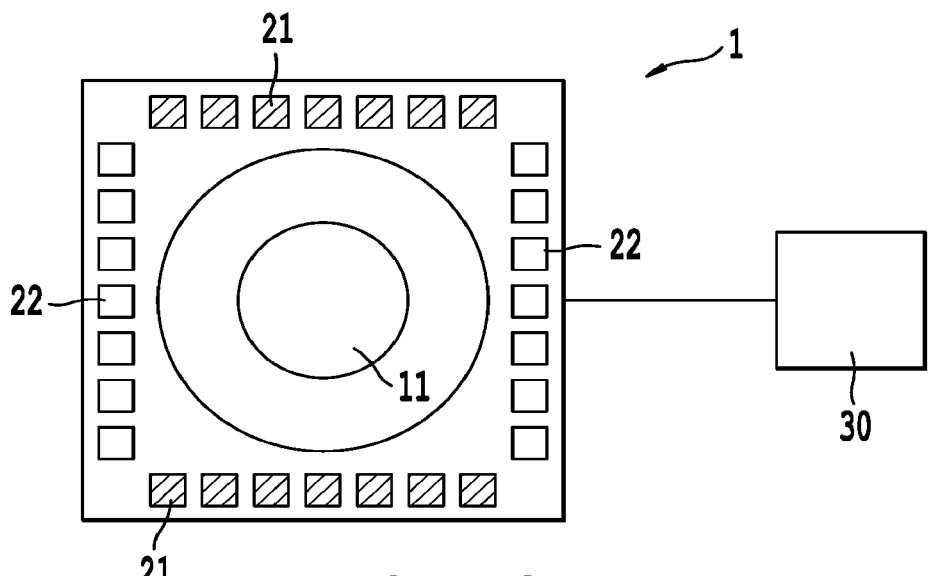
FIG. 2 shows a further embodiment of a surveillance apparatus according to the present disclosure comprising a radar sensor and an optical camera.

FIG. 2 shows a further embodiment of the surveillance apparatus 1. The surveillance apparatus 1 according to this embodiment comprises the optical camera 10 having the aperture 11 and the transmitting antennas 21 provided in two lines of seven single transmitting antenna elements 21 which are disposed on opposite sides of the aperture 11. The surveillance apparatus 1 further comprises the receiving antenna elements 22 which are formed of two rows of seven single receiving antenna elements 22, wherein the two rows are disposed on opposite sides of the optical aperture 11. The antennas 21, 22 are connected to the processing unit 30 which controls the transmitting antenna elements 21 and receives signals from the receiving antenna elements 22 corresponding to the received electromagnetic radiation. The processing unit 30 is configured to estimate a distance and a direction of the position of an object in the field of view of the antennas 21, 22, wherein the distance and the direction are estimated separately on the basis of a maximum likelihood based algorithm performed on a correlation matrix which is determined on the basis of the signals corresponding to the respectively received electromagnetic radiation at the receiving antenna elements 22.

The radar sensor comprises at least one transmit antenna 21 and a plurality of receive antennas 22. In the case that the radar sensor comprises merely one transmit antenna 21, the effect array will be the array of receiving antenna elements 22. In the case that the radar sensor comprises multiple transmit antenna elements 21, then the radar sensor operate with the multiple input multiple output (MIMO) principle and the effect array is a virtual antenna array formed by the transmitting antenna elements 21 and receiving antenna elements 22. In this case, the maximum size of the virtual array is a number of transmitting antenna elements 21 multiplied by the number of the receiving antenna elements 22.

The angle estimation is done with the effect array, which means for the none-MIMO case, it is the array of receiving antenna elements 21 and for the MIMO case, it is the virtual array formed by the transmitting antenna elements 21 and the receiving antenna elements 22.

Figure 3:
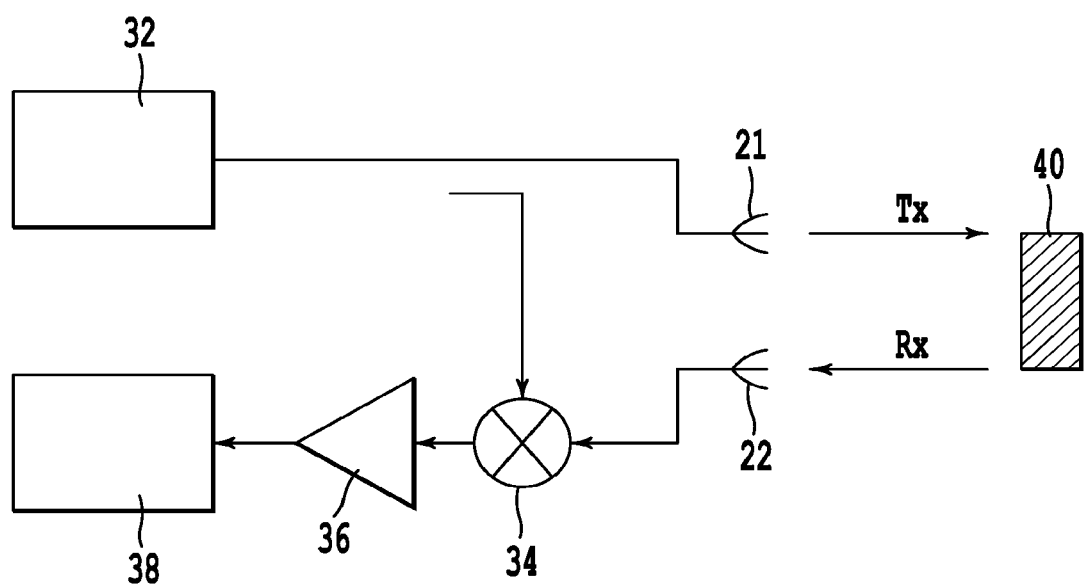
FIG. 3 shows an embodiment of a frequency modulated continuous wave radar system, FIG. 4a, b shows a far field model and a near field signal model.

FIG. 3 shows a frequency modulated continuous wave radar system (FMCW). The radar system comprises a frequency modulator 32 which provides a continuous wave signal that is frequency modulated, wherein the frequency is changing preferably continuously over time in order to produce a chirp pulse. The frequency modulated wave signal, i.e. the chirp pulse is transmitted by the transmitting antenna 21 as a transmitted signal Tx to an object 40 in the field of view to be examined and the electromagnetic waves are reflected by the object 40 and received by the receiving antenna 22 as a received signal Rx. The received signal Rx is mixed with the transmitted frequency modulated signal Tx by means of a mixer 34. The so determined mixed signal is amplified by means of an amplifier 36 and analyzed by a spectrum analyzer 38.

Since the transmitted frequency modulated wave signal, i.e. the chirp pulse is changing the frequency over time, the frequency of the mixed signal depends on a distance between the antennas 21, 22 and the object 40. Hence, a distance between the antennas 21, 22 and the object 40 can be determined on the basis of the frequency of the mixed signal, i.e. the difference between the frequency of the transmitted frequency modulated signal Tx and the received signal Rx. The resulting frequency of the mixed signal is also known as beat frequency and directly proportional to the distance between the antennas 21, 22 and the object 40.

The beat frequency can be converted from the analogue domain to the digital domain by means of an analogue to digital converter and the complex I/Q signal from the analogue to digital converter is transformed to the frequency domain in the spectrum analyser 38 by means of a Fourier transformation to determine the respective beat frequency and to determine the distance of the antennas 21, 22 and the object 40.

The model for the frequency modulated continuous wave (FMCW) signal can be expressed by:

$$S(t) = A_C \cos\left[\omega_0 t + \frac{A_b}{2}t^2\right], 0 \le t \le T_b \quad (1)$$

wherein $T_b$ is the chirp pulse period, in which the frequency of the transmitted signal Tx is continuously increased and $\omega_0$ is the initial frequency of the transmitted signal and $A_b$ is the chirp rate. The chirp pulses are transmitted and reflected by the object 40 and the received signal Rx reflected from the object 40 can be expressed by:

$$S(t - T_P) = A_C \cos\left[\omega_0(t - T_P) + \frac{A_b}{2}(t - T_P)^2\right] \quad (2)$$

by mixing the received signal Rx as shown in equation 2 and the transmitted signal Tx as shown in equation 1 and further low pass filtered, the mixed signal or the beat signal $S_b$ can be obtained by:

$$S_b = \frac{A_C^2}{2}\left[\cos\left\{A_b T_P t + \left(\omega_0 T_P - \frac{A_b}{2}T_P^2\right)\right\}\right] \quad (3)$$

as shown in equation 3, the beat frequency signal $S_b$ comprises a time variant component $A_b T_p t$, which is a sine wave. The frequency of the sine wave depends on the flight time $T_p$ of the transmitted signal Tx and the received signal Rx. This flight time $T_p$ can be used to determine the distance of the object 40 from the antennas 21, 22 by determining the beat frequency $f_b$ on the basis of a Fourier transformation of the mixed signal $S_b$ and the respective spectrum analysis. The distance of the object 40 can be found by a search of the Fourier transformation peaks in the obtained spectrum.

The phase information of the beat signal $S_b$ shown in equation 3

$$\left(\omega_0 T_P - \frac{A_b}{2}T_P^2\right)$$

remains unchanged during the Fourier transformation and can be used for the estimation of a direction or an angle of the position of the object 40 with respect to the antennas 21, 22 or the antenna array. Hence, the estimation of the direction or the angle of the position of the object 40 in the field of view is decoupled from the determination of the distance of the object 40 in the field of view so that two independent estimation or determination steps are performed. As described in detail below, the first step is to determine the signal spectrum and to determine the distance of the object 40 by determining peaks in the determined spectrum. In a following step, the angle of the arrival of the received signal Rx including the above-mentioned phase information at the determined distance of the object 40 is estimated from the array of antennas 21, 22.

Figure 4A:
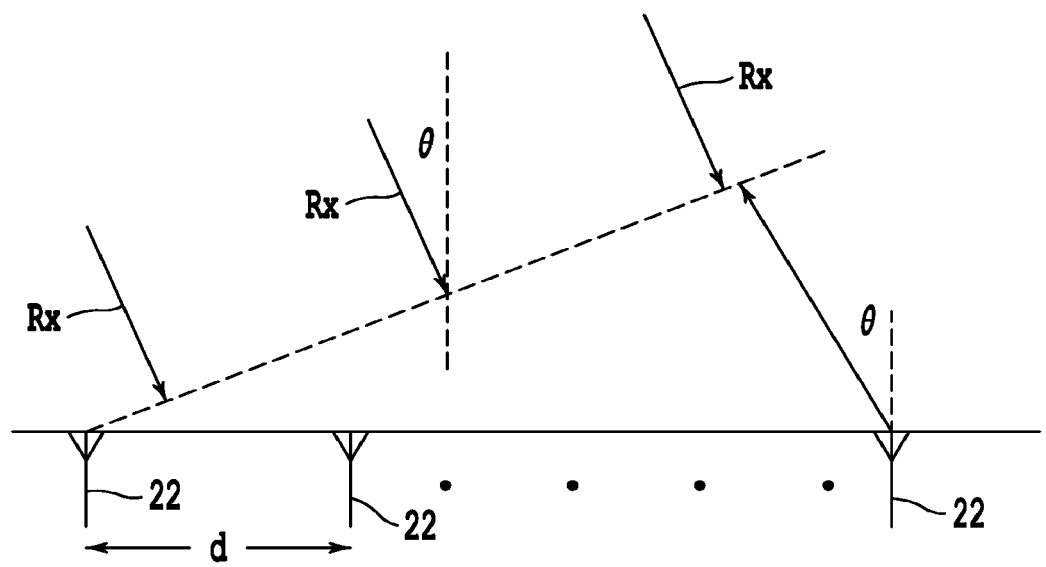

In a far field assumption as schematically shown in FIG. 4a, the receiving signals Rx as the incident signals are assumed to be a plane wave. The incident angle θ of the receiving signals Rx for each of the receive antenna elements 22 is identical to the common angle θ of arrival as shown in FIG. 4a. In an array of M receive antenna elements 22 receiving the receive signals Rx generated by a number of D narrow band sources in the far field, an output X(t) of the antenna array 22 is sampled at time instances t=1, ..., T. For a plurality of signal sources such as the reflecting object 40 located at an angle or a direction θ=[θ₁, ..., θ_D], the output X(t) of the array can be described as $$X(t) = A(\theta)S(t) + N(t) \quad (4)$$

where $A(\theta) = [a(\theta_1), \ldots, a(\theta_D)]$ consists of D steering vectors. $S(t) = [s_1(t), \ldots, s_d(t)]^T$ denotes signal wave forms and N(t) denotes a noise vector. The signal vector S(t) is considered to be deterministic. The noise vector N(t) at each receiving antenna element 22 is independent from one snapshot to another snapshot and assumed to be complex normally distributed with zero mean and variance $\sigma_n^2$. The number of signals D received from different objects 40 in the field of view is assumed to be known. The problem is usually to estimate the incident angle θ from the observed and determined data X={X(t): 1<t<T}.

A common method to estimate the incident angle θ is to use the maximum likelihood and to maximize the concentrated likelihood function:

$$lx(\theta) = -\log tr[(I - P(\theta))R_{xx}] \quad (5)$$

wherein $$P(\theta)=A(\theta)(A(\theta)^H A(\theta))^{-1} A(\theta)^H \quad (6)$$

denotes the projection matrix of A(θ).

The correlation matrix of the signals received from the receiving antennas 22 can be expressed by:

$$R_{xx} = \frac{1}{T}\sum_{t=1}^{T} X(t)X(t)^H \quad (7)$$

wherein the steering matrix A(θ) is assumed to be full rank. Obviously, an optimization of lx(θ) involves a complicated non-linear M-dimensional search over the parameter space $\theta=\theta_1 \times \theta_2 \times \ldots \times \theta_M$.

Figure 4B:
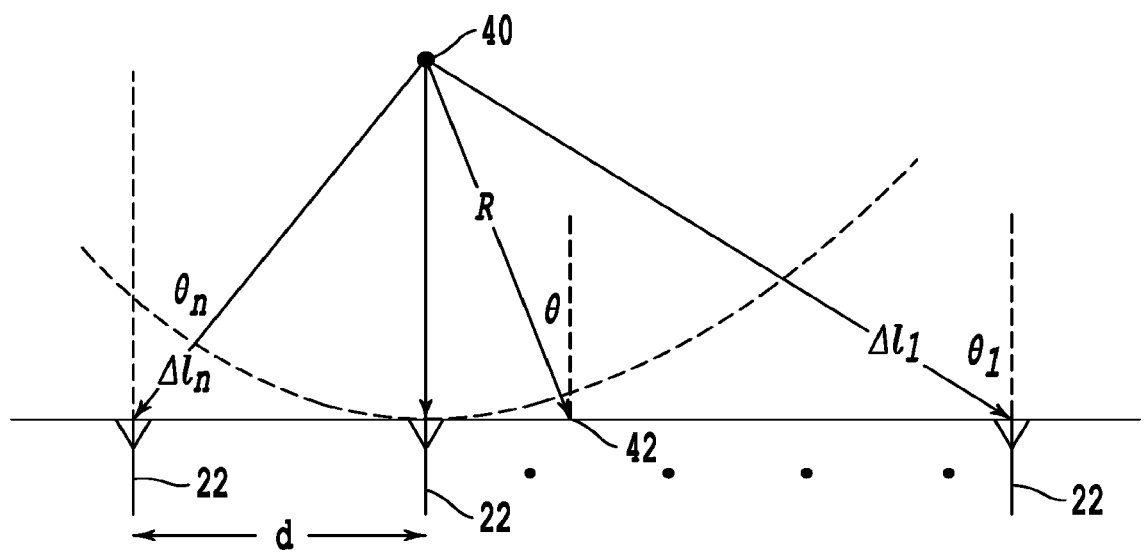

In the contrary for the case that the object 40 is in the near field of the receive antennas 22, the receiving signals Rx impinge at the different receive antenna elements 22 with different angles $\theta_1, \ldots, \theta_n$ so that the far field assumption cannot be used. Using the polar coordinates, the incident angle θ is a function of the distance R of the object 40 and the incident angle θ to the array center 42 as shown in FIG. 4b. As illustrated in FIG. 4b, the receiving signals Rx reflected from the object 40 at the position R, θ impinge on the array of antennas 21, 22. If the center 42 of the array is used as a reference position, two way path difference from the object 40 to the antenna elements 22 are $\Delta l_1, \Delta l_2, \ldots, \Delta l_M$, wherein Δl is a function of R, θ.

Each signal received by each of the antenna elements 22 can be written as:

$$s(t) \cdot e^{-j\omega \frac{\Delta l_i}{c}} \quad (8)$$

wherein the signal received at each of the M receive antennas or array elements 22 are linear combinations of the D incident signals received from different objects 40 in the field of view and noise. Using a signal model for D different signals incident on the array of antenna elements 22 and corrupted by noise, the signal received by one of the antenna elements 22, i.e. antenna element m is:

$$x_m = \sum_{i=1}^{D} a_m(R_i, \theta_i) s_i + n_m \quad (9)$$

The signal received by the array of receive antennas 22 can be written in the following form:

$$\begin{bmatrix} x_1 \\ x_2 \\ \vdots \\ x_M \end{bmatrix} = \begin{bmatrix} a_1(R_1, \theta_1) & a_1(R_2, \theta_2) & \cdots & a_1(R_D, \theta_D) \\ a_2(R_1, \theta_1) & a_2(R_2, \theta_2) & & \vdots \\ \vdots & & \ddots & \vdots \\ a_M(R_1, \theta_1) & \cdots & \cdots & a_M(R_D, \theta_D) \end{bmatrix} \begin{bmatrix} s_1 \\ s_2 \\ \vdots \\ s_D \end{bmatrix} + \begin{bmatrix} n_1 \\ n_2 \\ \vdots \\ n_M \end{bmatrix} \quad (10)$$

or in a short form as:

$$X = A(R,\theta)S + N \quad (11)$$

wherein $$S=[s_1 s_2 \ldots s_D]^T$$

$$A=[a(R_1,\theta_1) a(R_2,\theta_2) \ldots a(R_D,\theta_D)]$$

$$N=[n_1 n_2 \ldots n_m]^T$$

and a(R, θ) is the near field array steering vector which can be expressed by:

$$a(R, \theta) = \left[ e^{-j\omega \frac{\Delta l_1}{c}} \ e^{-j\omega \frac{\Delta l_2}{c}} \ e^{-j\omega \frac{\Delta l_3}{c}} \ \ldots \ e^{-j\omega \frac{\Delta l_m}{c}} \right] \quad (12)$$

the maximum likelihood estimation for the angle θ for a defined distance R is given by:

$$lx(\theta,R) = -\log tr[(I-P(\theta,R))R_{xx}] \quad (13)$$

wherein $P(\theta, R)=A(\theta, R)(A(\theta, R)^H A(\theta, R))^{-1} A(\theta, R)^H$ is the projection matrix of A(θ, R) for a position θ, R of the object 40. Compared to the far field case, the steering vector is replaced with the near field steering vector which is dependent on the distance R.

The two-dimensional estimation problem to estimate the distance R and the angle θ of the position of the object 40 is converted into multiple one-dimensional problems to separately estimate the distance R and the angle θ. The time samples of different measurements can be used to obtain the correlation matrix as shown in equation 7. However, the time dependent signals can be transformed by a Fourier transformation to the frequency domain and the frequency peaks in the frequency spectrum can be chosen which correspond to the same object 40 in the field of view and the signal vectors over multiple snapshots can be used to estimate the correlation matrix X. If it is assumed that an amount of N snapshots are available for the estimation, the correlation matrix $R_{xx}$ is given as:

$$R_{xx} = \frac{1}{N}\sum_{n=1}^{N} F_n(\omega)F_n(\omega)^H \quad (14)$$

In general, the frequency bins or peaks which correspond to the same object 40 in the field of view are selected by selecting the same frequency bins from the spectrums of the different receive antenna elements 22. This can however merely applied if the objects 40 are in the far field as shown in FIG. 4a. In the near field shown in FIG. 4b this assumption would introduce errors to the signals received by the receive antennas 22, since the near field comprises path differences from the object 40 to the different receive antennas 22 which are not linear. Instead, a parabolic shape of different frequencies in the field of view are introduced. The closer the object 40 is to the array of receive antennas 22, the more errors will be introduced to the resulting signal.

To estimate the correlation matrix $R_{xx}$ correctly is important to extract the receiving signal Rx reflected by the same object 40 as precise as possible from the overall measured time domain signals received by the antenna array in general. The reflected signals Rx are as mentioned above after mixing a sine wave and the information which is needed is only the amplitude and the starting phase of this signal Rx. The correlation matrix $R_{xx}$ of the position R, θ of the object 40 is estimated and for each antenna 21, 22 a distance to the object 40 can be calculated as $r_1, r_2, r_3 \ldots, r_n$, respectively by means of a Fourier transformation. The corresponding frequencies $\omega_1, \omega_2, \omega_3, \ldots, \omega_m$ for each antennas 21, 22 can be obtained from the formula:

$$\omega_i = \frac{4\pi A_b r_i}{c} \quad (15)$$

To obtain a precise amplitude and phase information from the reflected signals Rx of all antenna elements 21, 22, a discrete time Fourier transformation (DTFT) can be used to extract the amplitude and phase information from the time domain measurement data. For an amount of K samples in the measured time domain data, for $i^{th}$ receive antenna of the receive antennas 22, and $j^{th}$ snapshots, the signal amplitude and phase reflected by the object 40 at the position R, θ is given by:

$$X_{i,j}(\omega_i) = \frac{1}{K} \sum_{k=1}^{K} x(k) \cdot e^{-j\omega_i k} = \frac{1}{K} \sum_{k=1}^{K} s(k) \cdot e^{-j\frac{4 \cdot \rho_i \cdot A_b \cdot r_i}{c} k} \quad (16)$$

wherein the signal vector for all the antennas 21, 22 in a single snapshot j are given by:

$$X_j(\omega) = [X_{1,j}(\omega_1) X_{2,j}(\omega_2) \ldots X_{M,j}(\omega_M)]^T \quad (17)$$

and the correlation matrix $R_{xx}$ is given by:

$$R_{xx} = = \frac{1}{N} \sum_{j=1}^{N} X_j(\omega) X_j(\omega)^H \quad (18)$$

substituting the equations 11 and 18 into equation 13, a maximum likelihood estimator for an array of the receive antenna elements 22 can be obtained using FMCW signals at a certain distance R of the object 40. Since the distance of the object 40 can be obtained by the Fourier transformation in advance of the maximum likelihood estimation, the estimation of the angle θ is separated from the estimation of the distance R so that the overall effort for determining the position of the object 40 can be reduced. Further, the estimation of the peak position is more precise especially if the object 40 is in the near field close to the array of antenna arrays.

The estimation of the distance and the angle is not only possible by a maximum likelihood algorithm but also applicable to any other maximum likelihood based algorithms including e.g. EM (expectation and maximization) and SAGE (space alternating generalized EM) algorithm, a Newton-Revson-type or conjugate gradient methods.

Further, for the successful application of the maximum likelihood based algorithm the number of objects 40 in the field of view from which electromagnetic radiation signals are reflected are determined on the basis of the eigenvalues of the correlation matrix $R_{xx}$. The eigenvalues of the correlation matrix $R_{xx}$ correspond to the signal source and the noise. In an optimal situation, the eigenvalues correspond to the noise are identical to the standard deviation of the noise and the eigenvalue corresponding to the received signal is significantly larger. Hence, a search for a peak of the eigenvalues or a change of the eigenvalues is performed to determine the number of reflected signals or the number of objects 40 in the field of view.

To determine the number of reflection signals or the number of objects 40 in the field of view, the eigenvalues of the correlation matrix are determined, the determined eigenvalues are sorted in an ascending order, the ratio between consecutive eigenvalues of the ascending order are determined and a threshold level is defined for the so-determined ratio so that the first peak of previously calculated ratio can be determined and the number of sources can be estimated. The eigenvalue before the detected peaks belong to the noise and the eigenvalues after the determined peak belong to the signal sources so that the number of objects 40 in the field of view can be precisely determined.

To generate range angle and intensity image, power of the reflected signals reflected by the object 40 or objects 40 in the field of view has to be estimated. The maximum likelihood based algorithm can estimate the incident angle θ of the object 40 however the power of the incoming signal cannot be estimated. Hence, an additional method and information must be used to estimate the power of the incoming signal. The power of the incoming signal is estimated on the basis of an amplitude of a beamformed signal which is weighted by a value of the correlation matrix $R_{xx}$ at a corresponding position. The beamforming is performed by filtering or delay of the received signals Rx received by the antenna elements 22 in order to receive a signal from a certain position R, θ and wherein the amplitude of the so-determined signal is weighted by a corresponding value of the same position derived from the correlation matrix $R_{xx}$. On the basis of different signals from different positions R, θ in the field of view, a map of amplitudes can be determined dependent on the respective position, wherein the power of the respective signals of the different positions is determined by multiplying the amplitude of the map and the corresponding value of the correlation matrix with each other.

In order to suppress false targets, joint estimation from maximum likelihood based algorithms and beam forming is performed to filter out the false targets. Therefore, when performing the model order estimation it is better to overestimate rather than to underestimate, because the false targets can be suppressed later when the power is estimated.

Figure 5:
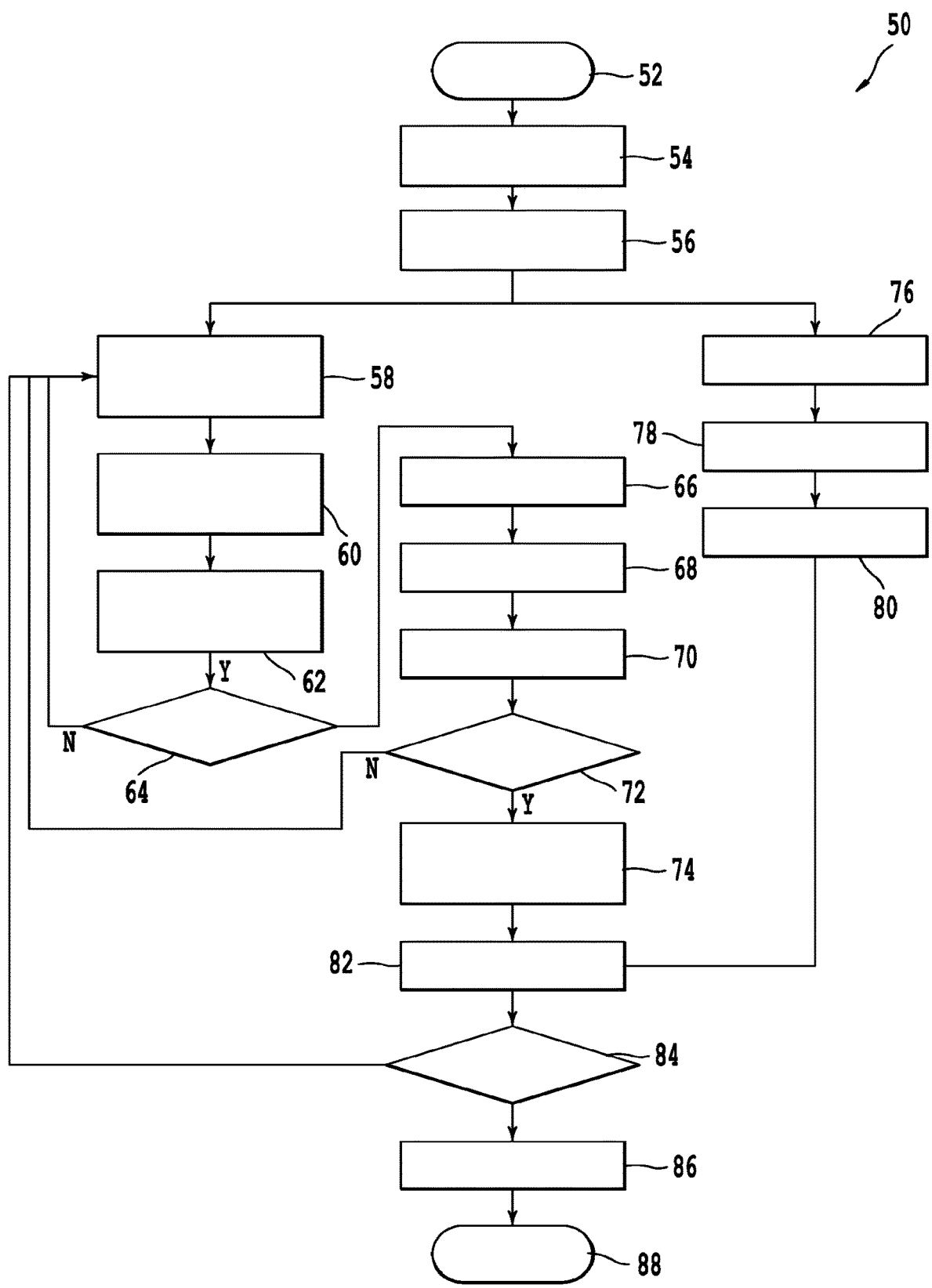
FIG. 5 shows a flow diagram of an embodiment of a surveillance method for determining an object in the field of view.

In FIG. 5 a schematic flow diagram of a method for estimating objects in the field of view is shown. The method is generally denoted by 50. The method starts at step 52 and different snapshots in the FMCW chirp period are acquired for each receiving antenna element 22 as shown at step 54. In step 56 a calibration for the acquired snapshots for each of the antenna elements 22 is performed.

At step 58, the actual distance $R_i$ to all the antenna elements 22 are calculated respectively. In the step 60, the beat frequency from the actual distance of all antennas is calculated and in step 62 the Fourier transformation is applied to the received signals to determine the calculated beat frequency for all antenna elements 22.

At step 64 it is checked whether the calculation has been done for all snapshots.

At step 66, the correlation matrix $R_{xx}$ is estimated using equation 18. At step 68 the number of objects 40 in the field of view is estimated from the correlation matrix $R_{xx}$. The maximum likelihood estimation is performed at step 70 given by equation 13. At step 72 it is determined whether the angle θ has been calculated.

If the angle θ has been calculated, the largest peaks are estimated by the maximum likelihood estimator as shown at step 74. The positions of the found peaks are the D incident signal directions.

In step 76 the digital beam forming for the different positions is performed by filtering and providing time delays to the received signals Rx and at step 78 a range processing for each angle e.g. by a Fourier transformation is performed.

At step 80 a two-dimensional map of amplitudes is created on the basis of the beam forming signals determined in step 76.

In step 82, the intensity of the detected signal, e.g. the power of the signals are determined as described above.

At step 84 it is checked whether all ranges have been estimated and if all ranges have been estimated, the list of positions of the objects 40 in the field of view including the distance, the angle and the intensity information is provided. At step 88, the method 50 ends.

Obviously, numerous modifications and variations of the present disclosure are possible in light of the above teachings. It is therefore to be understood that within the scope of the appended claims, the disclosure may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

It follows a list of further embodiments of the disclosed subject matter:

1. A surveillance apparatus for determining a position of an object in a field of view, comprising:
   a radar sensor having at least one transmitting antenna configured to emit or to transmit electromagnetic radiation and a plurality of receiving antennas configured to receive electromagnetic radiation including a reflection signal of the object, wherein the antennas form an antenna array, and
   a processing unit connected to the radar sensor to receive signals from the receiving antennas corresponding to the received electromagnetic radiation, wherein the processing unit is configured to estimate a distance and a direction of the position of the object in the field of view with respect to the radar sensor, wherein the processing unit is configured to estimate the distance and the direction separately on the basis of a maximum likelihood based algorithm.

2. The surveillance apparatus according to embodiment 1, wherein the processing unit is configured to determine the distance on the basis of a Fourier transformation of the plurality of received signals.

3. The surveillance apparatus according to embodiment 2, wherein the processing unit is configured to determine frequency peaks in the transformed spectrum and to determine the distance of the object in the field of view on the basis of the frequency peaks.

4. The surveillance apparatus according to embodiment 3, wherein the frequency peaks correspond to the same object in the field of view.

5. The surveillance apparatus according to embodiment 1, wherein the processing unit is configured to determine the direction of the position of the object as an angle with respect to the radar sensor.

6. The surveillance apparatus according to embodiment 5, wherein the angle and the direction are determined with respect to a centre of the radar sensor.

7. The surveillance apparatus according to embodiment 5, wherein the processing unit is configured to determine the angle on the basis of a phase angle of the received signals.

8. The surveillance apparatus according to embodiment 5, wherein the processing unit is configured to determine the angle using the determined distance.

9. The surveillance apparatus according to embodiment 1, wherein the processing unit is configured to use a near-field wave front model in order to determine the distance and the direction of the position of the object in the field of view.

10. The surveillance apparatus according to embodiment 1, wherein the processing unit is configured to determine a correlation matrix on the basis of the plurality of different received signals.

11. Surveillance apparatus according to embodiment 10, wherein the correlation matrix is determined in different consecutive measurements of the radar sensor.

12. The surveillance apparatus according to embodiment 10, wherein the processing unit is configured to determine an amount of different reflection signals from the received signals corresponding to different objects in the field of view on the basis of eigenvalues of the covariance matrix.

13. The surveillance apparatus according to embodiment 12, wherein the eigenvalues are compared to eigenvalues of a standard deviation to determine the amount of different reflection signals.

14. The surveillance apparatus according to embodiment 13, wherein the eigenvalues are sorted in an ascending order and wherein a ratio of consecutive eigenvalues in the ascending order is determined and wherein the processing unit is configured to determine the amount of different signals on the basis of a threshold level for the ratio of the consecutive eigenvalues.

15. The surveillance apparatus according to embodiment 10, wherein the processing unit is configured to determine a power of signals received by the radar sensor on the basis of an amplitude of a beamformed signal weighted by a value of the correlation matrix.

16. The surveillance apparatus according to embodiment 15, wherein a map of amplitudes is determined for different positions in the filed of view on the basis of a corresponding plurality of beamformed signals and wherein the power of the signals of the different positions is determined on the basis of the map of amplitudes and the corresponding values of the correlation matrix.

17. The surveillance apparatus according to embodiment 1, wherein the radar sensor comprises emitting antennas configured to emit electromagnetic radiation signals, which are formed as frequency modulated continuous wave signals and wherein the received signals corresponding to the received electromagnetic radiation have different frequencies each dependent on a distance to the object in the field of view to the respective receiving antenna.

18. The surveillance apparatus according to embodiment 1, further comprising an optical camera configured to capture images based on received light.

19. The surveillance apparatus according to embodiment 18, wherein the optical camera comprises a camera aperture and wherein the transmitting antennas and/or the receiving antennas are arranged around the camera aperture.

20. A surveillance method for estimating a position of an object in a field of view of a radar sensor, comprising the steps of:

receiving electromagnetic radiation from the field of view by means of a plurality of receiving antennas, receiving signals from the receiving antennas corresponding to the received electromagnetic radiation, estimating a distance and a direction of the position of the object in the field of view with respect to the radar sensor, wherein the distance and the direction are estimated separately using a maximum likelihood based algorithm.

21. A non-transitory computer-readable recording medium that stores therein a computer program product, which, when executed by a processor, causes the method according to embodiment 20 to be performed.

The present application claims priority to European Patent Application 14200467.0 filed by the European Patent Office on 29 Dec. 2014, the entire contents of which being incorporated herein by reference.

The invention claimed is:

1. A surveillance apparatus for determining a position of an object among objects in a field of view, comprising:
   a radar sensor having at least one transmitting antenna configured to transmit electromagnetic radiation and a plurality of receiving antennas configured to receive electromagnetic radiation including a reflection signal of the object, wherein the antennas form an antenna array, and
   processing circuitry configured to
      receive signals from the receiving antennas corresponding to the received electromagnetic radiation,
      calculate, as a beat frequency, a frequency of mixed signals of the received signals and signals transmitted from the transmitting antenna,
      estimate a correlation matrix on the basis of the received signals,
      estimate a number of the objects in the field of view from the estimated correlation matrix,
      perform a maximum likelihood estimation using the calculated beat frequency, the estimated correlation matrix and the estimated number of the objects to calculate an angle of the object,
      determine whether an angle of the object has been calculated,
      repeat the calculation of the beat frequency, the estimation of the correlation matrix and the number of the objects, and the performance of the maximum likelihood estimation in a case where it is determined that the angle of the object has not been calculated,
      determine frequency peaks in a transformed signal spectrum of the received signals in a case where it is determined that the angle of the object has been calculated,
      determine each distance of the objects in the field of view based on the determined frequency peaks,
      determine a map of amplitudes for different positions in the field of view based on a corresponding plurality of beamformed signals,
      determine a power of signals of the different positions received by the radar sensor based on the determined map and corresponding values of the estimated correlation matrix, and
      output the direction, the distance, and the power of signals of the position of the object in the field of view with respect to the radar sensor separately.

2. The surveillance apparatus as claimed in claim 1, wherein the processing circuitry is configured to determine the distance on the basis of a Fourier transformation of the plurality of received signals.

3. The surveillance apparatus as claimed in claim 2, wherein the frequency peaks correspond to the same object in the field of view.

4. The surveillance apparatus as claimed in claim 1, wherein the processing circuitry is configured to determine the direction of the position of the object as an angle with respect to the radar sensor.

5. The surveillance apparatus as claimed in claim 4, wherein the angle and the direction are determined with respect to a center of the radar sensor.

6. The surveillance apparatus as claimed in claim 4, wherein the processing circuitry is configured to determine the angle on the basis of a phase angle of the received signals.

7. The surveillance apparatus according claim 4, wherein the processing circuitry is configured to determine the angle using the determined distance.

8. The surveillance apparatus as claimed in claim 1, wherein the processing circuitry is configured to use a near-field wave front model in order to determine the distance and the direction of the position of the object in the field of view.

9. The surveillance apparatus as claimed in claim 1, wherein the correlation matrix is determined in different consecutive measurements of the radar sensor.

10. The surveillance apparatus as claimed in claim 1, wherein the processing circuitry is configured to determine an amount of different reflection signals from the received signals corresponding to different objects in the field of view on the basis of eigenvalues of the correlation matrix.

11. The surveillance apparatus as claimed in claim 10, wherein the eigenvalues are compared to a standard deviation of noise to determine the number of the objects.

12. The surveillance apparatus as claimed in claim 11, wherein
   the eigenvalues are sorted in an ascending order,
   a ratio of consecutive eigenvalues in the ascending order is determined, and
   the processing circuitry is configured to determine the number of the objects on the basis of a threshold level for the ratio of the consecutive eigenvalues.

13. The surveillance apparatus as claimed in claim 1, wherein
   the radar sensor comprises emitting antennas configured to emit electromagnetic radiation signals, which are formed as frequency modulated continuous wave signals, and
   the signals corresponding to the received electromagnetic radiation have different frequencies each dependent on a distance to the object in the field of view to the respective receiving antenna.

14. The surveillance apparatus as claimed in claim 1, further comprising an optical camera configured to capture images based on received light.

15. The surveillance apparatus as claimed in claim 14, wherein
   the optical camera comprises a camera aperture, and
   the transmitting antennas and/or the receiving antennas are arranged around the camera aperture.

16. A surveillance method for estimating a position of an object among objects in a field of view of a radar sensor, comprising:
   transmitting electromagnetic radiation by at least one transmitting antenna,
   receiving electromagnetic radiation from the field of view by a plurality of receiving antennas, receiving signals from the receiving antennas corresponding to the received electromagnetic radiation, calculating, using processing circuitry, as a beat frequency, a frequency of mixed signals of the received signals and signals transmitted from the transmitting antenna, estimating a correlation matrix on the basis of the received signals, estimating a number of the objects in the field of view from the estimated correlation matrix, performing a maximum likelihood estimation using the calculated beat frequency, the estimated correlation matrix and the estimated number of the objects to calculate an angle of the object, determining whether an angle of the object has been calculated, repeating the calculation of the beat frequency, the estimation of the correlation matrix and the number of the objects, and the performance of the maximum likelihood estimation in a case where it is determined that the angle of the object has not been calculated, determining frequency peaks in a transformed signal spectrum of the received signals in a case where it is determined that the angle of the object has been calculated, determining each distance of the objects in the field of view based on the determined frequency peaks, determining a map of amplitudes for different positions in the field of view based on a corresponding plurality of beamformed signals, determining a power of signals of the different positions received by the radar sensor based on the determined map and corresponding values of the estimated correlation matrix, and outputting the direction, the distance, and the power of signals of the position of the object in the field of view with respect to the radar sensor separately.

17. A non-transitory computer-readable recording medium including executable instructions, which when executed by a computer cause the computer to execute a method for estimating a position of an object among objects in a field of view of a radar sensor, the method comprising:

transmitting electromagnetic radiation by at least one transmitting antenna, receiving electromagnetic radiation from the field of view by a plurality of receiving antennas, receiving signals from the receiving antennas corresponding to the received electromagnetic radiation, calculating, as a beat frequency, a frequency of mixed signals of the received signals and signals transmitted from the transmitting antenna, estimating a correlation matrix on the basis of the received signals, estimating a number of the objects in the field of view from the estimated correlation matrix, performing a maximum likelihood estimation using the calculated beat frequency, the estimated correlation matrix and the estimated number of the objects to calculate an angle of the object, determining whether an angle of the object has been calculated, repeating the calculation of the beat frequency, the estimation of the correlation matrix and the number of the objects, and the performance of the maximum likelihood estimation in a case where it is determined that the angle of the object has not been calculated, determining frequency peaks in a transformed signal spectrum of the received signals in a case where it is determined that the angle of the object has been calculated, determining each distance of the objects in the field of view based on the determined frequency peaks, determining a map of amplitudes for different positions in the field of view based on a corresponding plurality of beamformed signals, determining a power of signals of the different positions received by the radar sensor based on the determined map and corresponding values of the estimated correlation matrix, and outputting the direction, the distance, and the power of signals of the position of the object in the field of view with respect to the radar sensor separately.

* * * * *